United States Patent

[11] 3,621,360

| [72] | Inventors | David Wiley<br>Walsall;<br>Maurice James Allport, Stourbridge, both of England |
|---|---|---|
| [21] | Appl. No. | 12,168 |
| [22] | Filed | Feb. 18, 1970 |
| [45] | Patented | Nov. 16, 1971 |
| [73] | Assignee | Joseph Lucas (Industries) Limited<br>Birmingham, England |
| [32] | Priority | Mar. 25, 1969 |
| [33] | | Great Britain |
| [31] | | 15,506/69 |

[54] BATTERY-CHARGING SYSTEM FOR A ROAD VEHICLE WITH GENERATOR FIELD CONTROLLED BY A THYRISTOR
2 Claims, 1 Drawing Fig.

[52] U.S. Cl. ........................................... 320/48, 320/64, 322/73, 322/99
[51] Int. Cl. ........................................... H02j 7/16
[50] Field of Search ........................... 320/48, 61, 64, 68; 322/99, 73

[56] References Cited
UNITED STATES PATENTS

| 3,009,091 | 11/1961 | Hallidy .......................... | 322/73 X |
| 3,349,318 | 10/1967 | Poppinger ..................... | 322/73 X |
| 3,430,124 | 2/1969 | Nolan ............................ | 322/99 X |
| 3,515,978 | 6/1970 | Williams et al. ............... | 320/64 X |
| 3,553,563 | 1/1971 | Kawashima ................... | 320/48 X |

Primary Examiner—J. D. Miller
Assistant Examiner—John M. Gunther
Attorney—Holman & Stern ABSTRACT: In a battery-charging system for a road vehicle there is a multiphase alternator which has a plurality of output terminals, a full-wave rectifier then connecting the output terminals to the vehicle battery but in addition there is a series circuit connecting one only of the output terminals to the vehicle battery, this series circuit including a resistor, a warning lamp and the ignition switch of the vehicle. Another set of diodes connects the other terminals of the alternator to the field winding through a thyristor, conduction of which is controlled to vary the field current, and an extra diode connects the field winding to the junction of the resistor and the warning lamp so that the warning lamp is illuminated when the ignition switch is closed until the alternator produces an output.

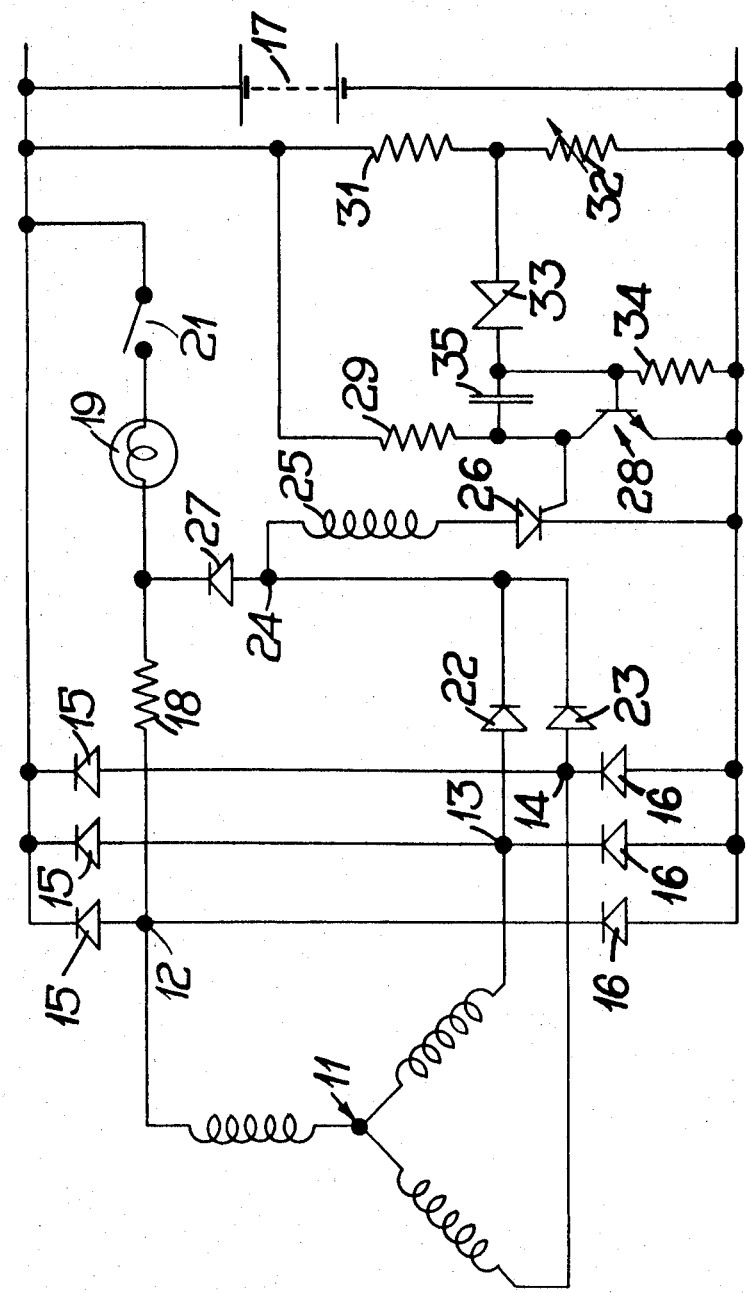

BATTERY-CHARGING SYSTEM FOR A ROAD VEHICLE WITH GENERATOR FIELD CONTROLLED BY A THYRISTOR

This invention relates to battery-charging systems for road vehicles.

A battery-charging system according to the invention comprises in combination a multiphase alternator having a plurality of output terminals, a full-wave rectifier connecting said output terminals to the vehicle battery so that when the alternator produces an output it charges the vehicle battery, a series circuit connecting one of said output terminals to the vehicle battery, said series circuit including a resistor, a warning lamp, and the ignition switch of the vehicle, a set of diodes connecting the output terminals of the alternator other than said one output terminal to a circuit including the field winding of the alternator and a thyristor, so that said set of diodes provides power to the field winding when the thyristor is conducting, means for providing gate current to the thyristor as long as the battery voltage is below a predetermined value, and a diode connecting the junction of the resistor and warning lamp to the circuit including the field winding and thyristor, the diode blocking the connection between said one terminal and the field winding so that the thyristor turns off once during each cycle of operation of the alternator, and the warning lamp being illuminated when the ignition switch is closed until the alternator produces an output.

An example of the invention is illustrated in the accompanying circuit diagram.

Referring to the drawing, a three-phase alternator 11 includes output terminals 12, 13, 14 which are connected through a full-wave rectifier consisting of two sets of diodes 15 and 16 to the battery 17 of a road vehicle. The terminal 12 is connected through a resistor 18, a warning lamp 19 and the ignition switch 21 of the vehicle to the positive terminal of the battery, and the terminals 13 and 14 are connected respectively to the anodes of diodes 22 and 23 the cathodes of which are connected by way of a terminal 24 to one end of the field winding 25 of the alternator, the other end of the field winding being connected to the negative battery terminal, which conveniently is earthed, through a thyristor 26. The terminal 24 is connected through the anode-cathode path of a diode 27 to the junction of the resistor 18 and warning lamp 19.

The gate of the thyristor 26 is connected to the collector of an NPN-transistor 28 having its emitter connected to the negative battery terminal and its collector connected through a resistor 29 to the positive battery terminal. Connected across the battery in series are a fixed resistor 31 and a variable resistor 32, the junction of which is connected through a Zener diode 33 to the base of the transistor 28, the base further being connected through a resistor 34 to the negative battery terminal, and the collector and base of the transistor 28 being interconnected through a capacitor 35.

In use, there is a permanent current flow through the resistor 29 and the gate-cathode path of the thyristor 26, but this current is so small that it will not discharge the battery 17 for a substantial period of time. The Zener diode 33 remains nonconductive until the battery voltage reaches a level predetermined by the variable resistor 32, at which point current flows through the Zener diode 33 to turn the transistor 28 on and remove the gate current from the thyristor 26. The capacitor 35 prevents the system from being operated by transients.

When the ignition switch is closed, a circuit is completed by way of the switch 21, lamp 19, resistor 18, the windings of the alternator, the diodes 22 and 23 and the winding 25 and thyristor 26, so that the warning lamp 19 is illuminated. When the alternator is producing an output, the potential at the junction of the resistor 18 and warning lamp 19 rises to the positive battery potential, so that the warning lamp 19 is extinguished. Current flows through the field winding 25 by way of the diodes 22 and 23, but once during each cycle of operation of the alternator the potential at the terminal 24 falls by virtue of the diode 27, so that no current is flowing through the thyristor 26. If at this time the battery voltage has risen to the predetermined value and the transistor 28 is conducting, the thyristor 26 will not start conducting again when it is forward biased, and so no current will flow in the field winding 25. As soon as the potential of the battery falls and the Zener diode 33 turns off, the transistor 28 will cease conducting so that the thyristor 26 conducts again to restore current flow in the field winding 25 as soon as the thyristor 26 is forward biased.

It will be appreciated that the resistor 18 performs three separate functions in the circuit. Firstly, it provides a return path for the lamp 19. Secondly, it provides excitation for the alternator both initially, when the lamp is illuminated, and also when the alternator is producing an output, except of course during the turnoff portion of each cycle. Thirdly, it acts in conjunction with the diode 27 to turn off the warning lamp 19 when the alternator is generating.

Having thus described our invention what we claim as new and desire to secure by Letters Patent is:

1. A battery-charging system comprising in combination a multiphase alternator having a plurality of output terminals, a full-wave rectifier connecting said output terminals to the vehicle battery so that when the alternator produces an output it charges the vehicle battery, a series circuit connecting one of said output terminals to the vehicle battery, said series circuit including a resistor, a warning lamp and the ignition switch of the vehicle, a set of diodes connecting the output terminals of the alternator other than said one output terminal to a circuit including the field winding of the alternator and a thyristor, so that said set of diodes provides power to the field winding when the thyristor is conducting, means for providing gate current to the thyristor as long as the battery voltage is below a predetermined value, and a diode connecting the junction of the resistor and warning lamp to the circuit including the field winding and thyristor, the diode blocking the connection between said one terminal and the field winding so that the thyristor turns off once during each cycle of operation of the alternator, and the warning lamp being illuminated when the ignition switch is closed until the alternator produces an output.

2. A system as claimed in claim 1 wherein the gate of the thyristor is connected in a series circuit containing a Zener diode, and said Zener diode is connected across the battery, said Zener diode remaining nonconductive until the battery voltage reaches said predetermined value, but allowing a current to pass therethrough to remove the gate current from said thyristor when the battery voltage reaches said predetermined value.

* * * * *